Inventor
PAUL S. DICKEY

Inventor
PAUL S. DICKEY

Patented Feb. 9, 1954

2,668,915

UNITED STATES PATENT OFFICE 2,668,915

VAPOR POWER CONTROL SYSTEM AND METHOD OF OPERATING VAPOR POWER SYSTEM

Paul S. Dickey, East Cleveland, Ohio, assignor to Bailey Meter Company, a corporation of Delaware Application November 23, 1945, Serial No. 630,489, now Patent No. 2,580,345, dated December 25, 1951, which is a continuation of application Serial No. 347,192, July 24, 1940. Divided and this application April 27, 1951, Serial No. 223,418

17 Claims. (Cl. 290—2)

This invention relates to method and means for operating and controlling the operation of power plants; particularly power plants including vapor generators, vapor utilizers and energy converters; such for example as steam generating boilers, steam utilizing turbines and electric generators.

Stationary boilers in central stations are often designed to feed a single turbine with steam at relatively high temperatures and pressures, for example, 950° F. and 1250 p. s. i. g. It is also possible to use the same vapor generator to supply steam alternately to a second turbine, or some other type of consumer, at relatively lower temperatures and pressures, for example, a temperature of 750° F. and pressure of 600 p. s. i. g. If, for example, the high pressure-temperature turbine loses its load suddenly it becomes immediately desirable, and perhaps necessary, to switch the output of the vapor generator to the lower pressure-temperature turbine, or other type of consumer, and this at a low standard of both temperature and pressure for the control of the vapor generator. If the high pressure-temperature turbine is driving an electric generator it might well be loss of load on said generator which will require shift of the vapor generator output to the alternate, low temperature-pressure, consumer.

Another example of the desirability of shifting between two standards of produced vapor may be found in marine service where it is well known to equip a ship with two propellers, each gear-connected to an ahead and an astern turbine; each pair of turbines exhausting to one or more surface condensers. The ahead turbine normally operating at relatively uniform and most efficient load may utilize high temperature steam, for example in a range of 900° F., and will extract sufficient work from the steam so that the exhaust to the condenser will be at a safe, low temperature for which the condenser is designed. The astern turbine, normally idling backwards, is given no opportunity to warm up when a signal for backing operation is had. Furthermore, the design of the infrequently operated astern turbine is one which will not extract from the steam as great an amount of work as will the normally loaded ahead turbine. Thus the steam exhausting from the astern turbine to the condenser will be at a relatively higher percentage of the initial temperature than the steam exhausting from the ahead turbine. The surface condenser, normally designed for the steam exhausted from the ahead turbine, is in danger of being damaged by the relatively high temperature steam exhausted from the astern turbine. It is therefore usually desirable to design and operate the astern turbine at a different temperature standard than the ahead turbine.

Although my invention is principally directed to the automatic control of apparatus upon which the load may change, it is helpful in order to understand my invention thoroughly to consider the situation where the vapor of a producer may be manually shifted between two different types of consumers such as an ahead turbine and an astern turbine with simultaneous shift between two temperature standards for the vapor being produced.

It is an object of my invention to provide a system which will accomplish a change in standard in both temperature and pressure for control purposes in stationary plants.

More specifically, it is an object of my invention to provide a system and means for control of a turbo-generator unit to alter the operation of the vapor supplier upon a change in load on the generator.

It is a more specific object of my invention to provide vapor at a predetermined temperature and pressure to a turbo-generator unit and to reduce the standards for temperature and pressure for the vapor to a predetermined minimum value upon the load on the generator reaching a predetermined minimum value and simultaneously shifting the vapor produced to an alternate consumer.

Further objects will become apparent from a study of the drawing and of the description in relation to the claims appended hereto.

This application is a division of my application Ser. No. 630,489, now Patent No. 2,580,345, dated December 25, 1951, filed November 23, 1945, as a continuation of my forfeited and now abandoned application Ser. No. 347,192, filed July 24, 1940.

Figure 1:
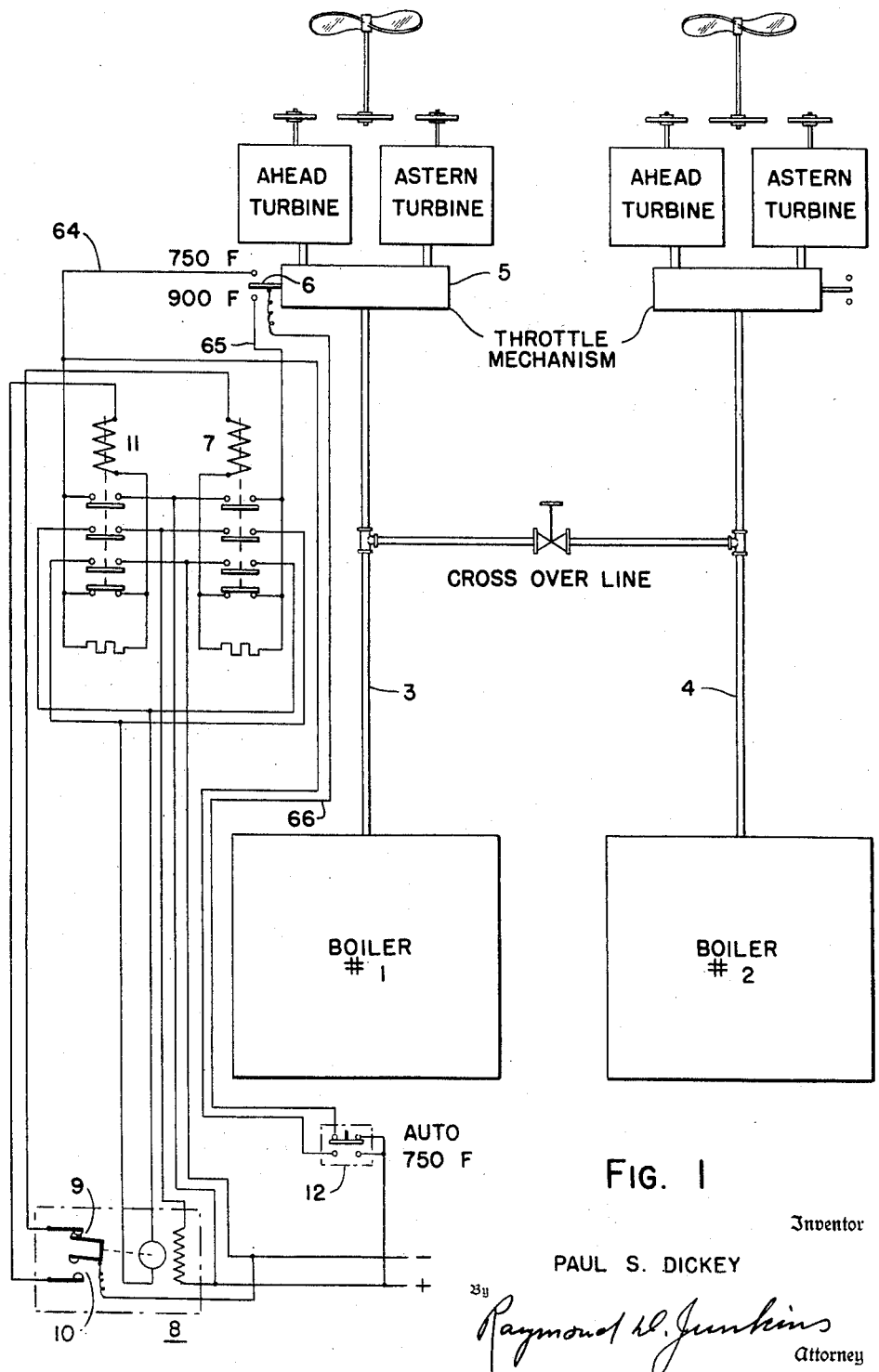
Fig. 1 is a diagrammatic illustration of a power plant for a ship including preferred arrangements of turbines and vapor generators and a partial disclosure of the control system in connection therewith.

In Fig. 1 I illustrate two boilers, each directly connected by means of a conduit to the throttle mechanism of an ahead and of an astern turbine for driving a ship's propeller. In other words, the ship has two propellers and each has connected thereto (through the necessary gears) an ahead turbine and an astern turbine. When the ship is moving forward, both ahead turbines are operating and the two astern turbines are being driven idling backwards. There is a crossover line shown interconnecting the steam conduits at 3 and 4. Inasmuch as the two power systems are duplicate I have illustrated and will describe certain control arrangements only in connection with boiler #1 and its related turbines. It is to be understood that equivalent control arrangements are in service adapted to boiler #2 and its related turbines.

The particular example illustrated in Fig. 1, and now to be described, utilizes steam from the boiler 1 at 900° F. for the ahead turbine, and at 750° F. for the astern turbine. Inasmuch as neither the astern turbine nor the condenser to which both of the turbines exhaust is adapted to withstand the application of relatively high temperature steam it becomes advisable and, in fact, necessary for safety, to change the temperature of the steam supplied to the throttle mechanism through the conduit 3 when operation is switched from the ahead turbine to the astern turbine, and vice versa. Such switching operation is accomplished by the throttle mechanism 5, which through its position and/or movement automatically changes the temperature standard to which the boiler 1 is operating.

For example, the arrangement shown in Fig. 1 provides a switch 6 connected to the throttle mechanism 5 in such manner that if the throttle is moved to admit steam to the ahead turbine, the contact arm 6 closes circuit with the contact marked 900° F., energizing the relay 7, which in turn causes a rotation of the motor 8 to adjust the temperature standard of the control mechanism for boiler #1 to a standard of 900° F. The motor 8 continues to rotate and move the standard adjusting mechanism until limited in its travel by the limit switch shown. As soon as the necessary movement of the temperature standard adjustment has been accomplished through predetermined motion of the motor 8, the limit switch 9 will break the holding circuit of the relay 7, stopping further rotation of the motor 8. Simultaneously with opening the limit switch 9, the limit switch 10 has become closed, so that an energization of the reversing relay 11 may immediately occur for rotation of the motor 8 in opposite direction to shift the standard to 750° F. if called for by a movement of the throttle mechanism 5 from the ahead turbine to the astern turbine and corresponding movement of the throttle contact arm 6 from the contact marked 900° F. to that which is marked 750° F.

It will thus be seen that whenever the drive of the propeller of unit #1, for example, is changed from the ahead turbine to the astern turbine, or vice versa, the motor 8 at the control location for boiler #1 is moved to shift the temperature standard adjustment to either 900° F. or 750° F. temperature standard as required for operation of the one turbine or the other turbine respectively.

It will be appreciated, of course, that the temperature standard may be other than 750° or 900° F., and the same arrangement is utilized to change from one to the other standard as may be required for proper turbine operation.

It has been found that when maneuvering or docking it may be desirable to rapidly switch from ahead to astern turbine operation, or in fact to have the ahead turbine of unit #1 operating, and the astern turbine of unit #2, or to swing rapidly from one combination to another. Inasmuch as such major changes in type of operation will be known sometime in advance and may be advised from the bridge to the fireroom, I have provided by the push button station 12 a means for readily taking the temperature control electrical system off from automatic and placing it on to a continuous 750° F. temperature standard basis. In other words, both the ahead and the astern turbines, or any combination of them, will be operated at 750° F. during such rapidly changing, maneuvering or docking operation. The push button station 12 assumes the last position placed in and as illustrated in Fig. 1 connects the system for complete automatic operation of shifting from one temperature standard to another. If the button is depressed into the alternate position from that shown, then the 750° F. contact gap on the throttle mechanism 5 is bridged and the 900° F. contact may not be close-circuited irrespective of any demand through the agency of the throttle mechanism for such closure by the contact arm 6.

Thus, so long as the push button station 12 breaks the automatic circuit and closes the 750° F. circuit, the temperature standard under which the boiler #1 is operating will be at 750° F. irrespective as to whether the ahead or the astern turbine is operating. Of course it will be appreciated that similar provisions are provided in connection with unit #2.

Figure 2:
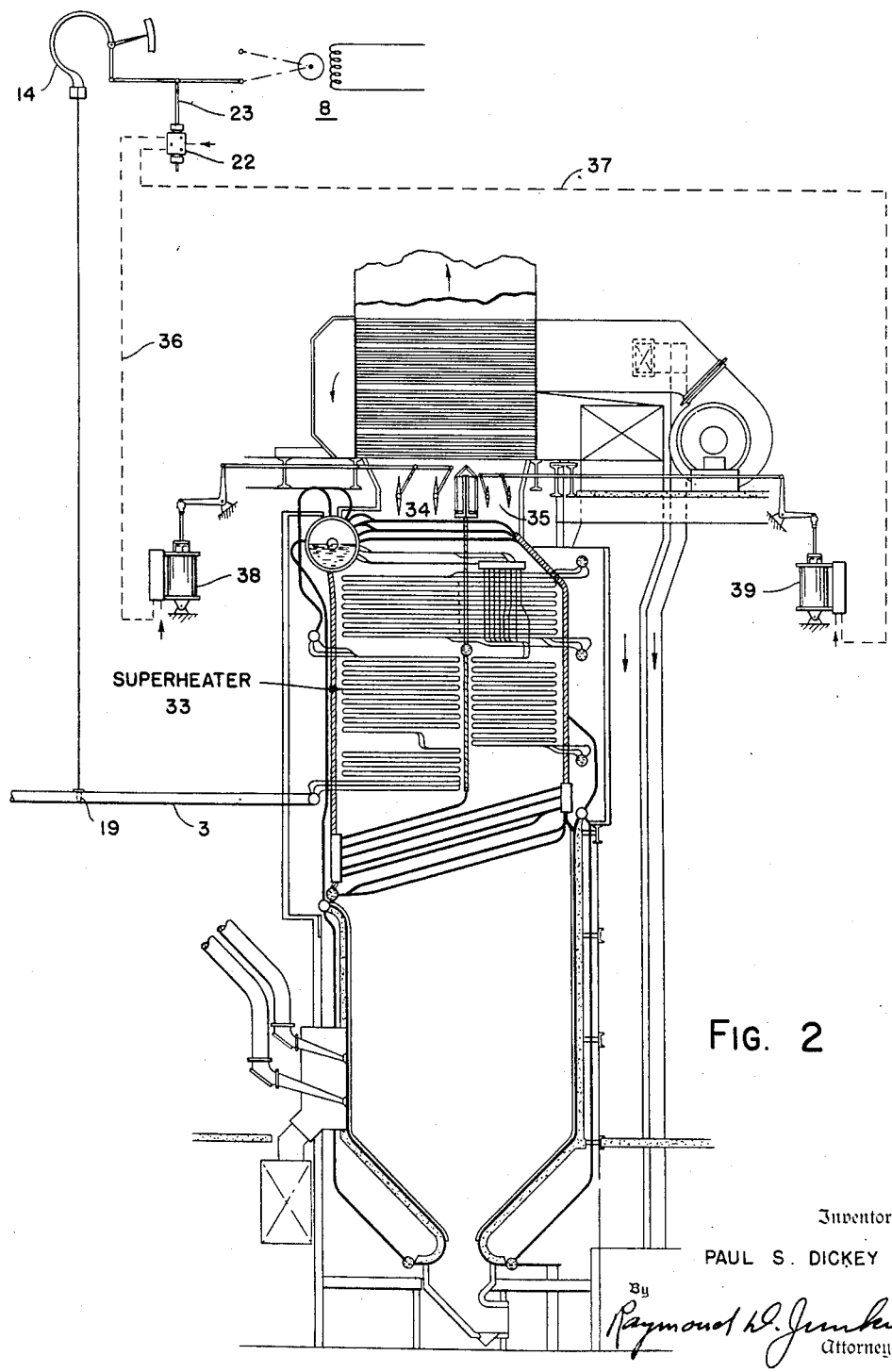
Fig. 2 is a sectional elevation of a high head open pass stationary type of vapor generator to which a portion of my invention has been applied.

In Fig. 2 I illustrate somewhat diagrammatically in sectional elevation what is commonly known as a high head vapor generator particularly adapted for use in stationary power plants. It is representative however of any natural circulation type of vapor generator provided with two parallel passes for the hot gaseous products of combustion leaving the furnace and wherein a superheating surface 33 lies in the left-hand gas pass and generating surface is arranged in the right-hand gas pass. In general, a distribution of the hot gaseous products of combustion through the two passes will determine the total temperature of the steam leaving the superheater 33 to the conduit 3. Such a distribution of gas flow between the two passes is accomplished by the relative positioning of dampers 34 and 35 at the exit of the passes.

The control arrangement utilizes a bulb 19, connected to a Bourdon tube 14, sensitive to the total temperature of the steam leaving the boiler and for positioning a pilot stem 23 relative to a pilot casing 22 to establish an air loading pressure representative of the temperature of the steam and in accordance with preselected standards to which the motor 8 adjusts. In this particular embodiment the pilot valve 22, 23 establishes two separate and distinct loading pressures, the one adapted to increase while the other decreases, with vertical positioning of the stem 23 in the casing 22. These loading pressures are effective respectively through the pipes 36, 37 upon pneumatic actuators 38, 39 for moving the dampers 34, 35.

The operation is such that as the dampers 34 tend to close, the dampers 35 tend to open, and vice versa. Thus simultaneous movement of the two sets of dampers 34, 35 causes a shifting of the proportion of flow of hot gaseous products of combustion through the two passes and relatively more or less heating available at the superheater 33. There is therefore a control of the total steam temperature in the conduit 3 in accordance with the relative positioning of the dampers 34, 35.

Figure 3:
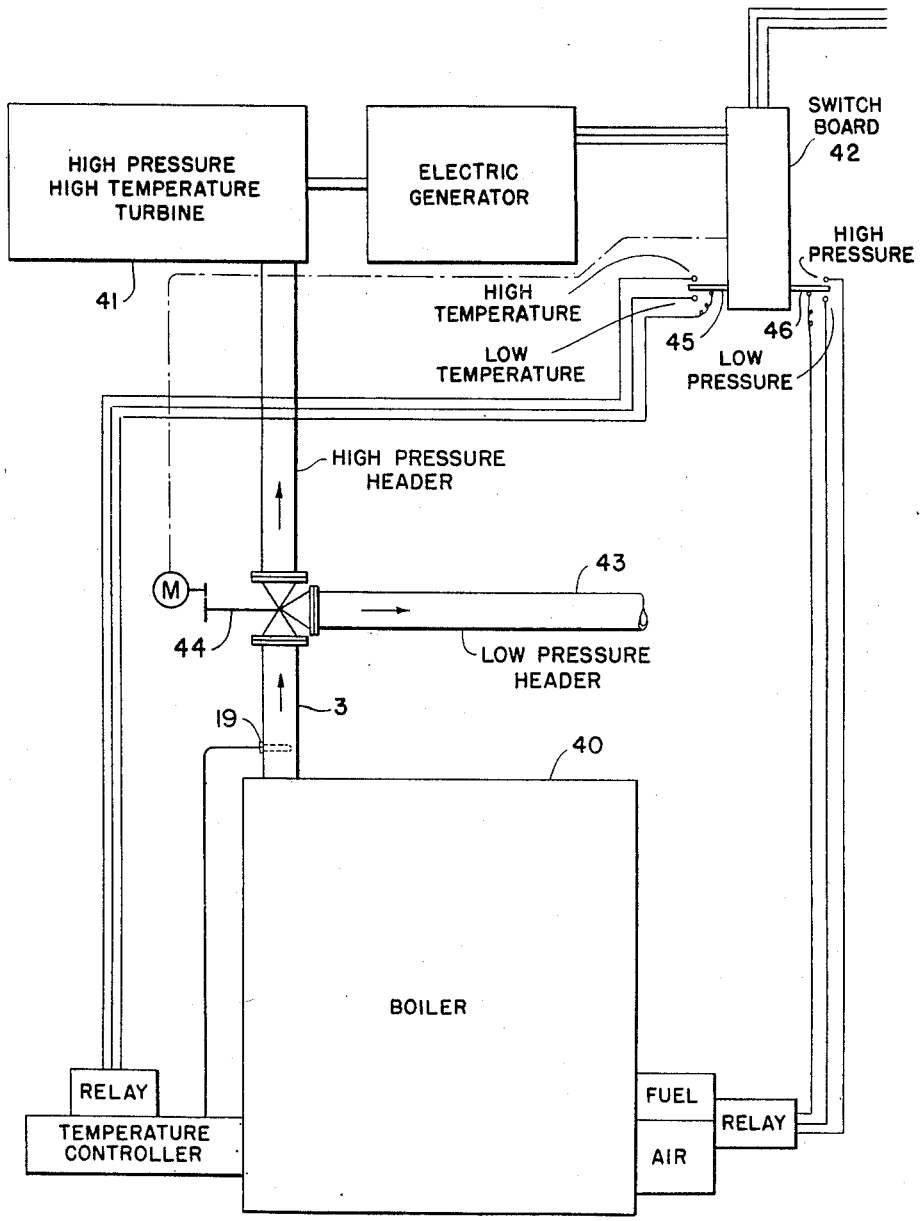
Fig. 3 is a diagrammatic illustration of a stationary power plant utilizing my invention in control of the power plant.

In Fig. 3 the boiler 40 normally supplies steam at relatively high pressure and high temperature directly to a turbine 41 driving an electric generator which is connected to a switchboard 42. The steam going to the turbine 41 may be for example at a pressure of 1200 p. s. i. g. and a temperature of 900° F. If for some reason the electric generator loses its load it becomes necessary to immediately divert the steam generated by the boiler 40 from the turbine 41 and to another turbine or plant header system which may be operating at a relatively lower temperature and pressure, as for example a temperature of 750° F. and a pressure of 600 p. s. i. g. Such action requires an immediate and automatic change in direction of the flowing steam and at the same time a change in the pressure and temperature standard to which the boiler 40 is controlled.

I have illustrated the conduit 3 which connects the boiler 40 with the turbine 41 as having a branch 43 leading to a lower pressure header. An electrically actuated valve 44 is arranged to control the flow of steam from the boiler 40 either to the turbine 41 or through the conduit 43 according to which extreme of travel the valve 44 is in.

The boiler is provided with the ordinary fuel and air supply means, as well as temperature sensitive control means similar to 8, 9, 10, 14, 22, 23 of Figs. 1 and 2 for regulating the total temperature of the steam leaving the boiler. The switchboard 42 is arranged with means sensitive to electric load on the turbo-generator unit, and is provided with two contacting mechanisms 45, 46. The contact 45 is arranged to control the temperature controller for changing the standard to which it controls from 900° F. to 750° F. or vice versa, depending upon the position of the contact 45. In similar manner the contact 46 establishes the pressure standard of, for example, 1200 p. s. i. g. or 600 p. s. i. g. to which the control of fuel and air is adjusted.

If the generator loses its load the mechanism at the switchboard 42 immediately shifts the temperature standard from 900° F. to 750° F., shifts the pressure standard from 1200 to 600, and actuates the valve 44 to a position such that all of the steam issuing from the boiler 40 will pass through the conduit 43 to a lower pressure header system. When it is desired to resume operation of the turbine 41 under high pressure and high temperature conditions it is necessary only to manually move the contacts 45, 46 to the high temperature high pressure position, and to actuate a push button station for moving the electrical valve 44 so that the conduit 43 is cut off and passage is open for the steam flow between the boiler 40 and the turbine 41. This may be accomplished from a single control switch if desired.

I have thus in this particular embodiment illustrated and described not only a change in standard for temperature control, but also a possible change in standard for pressure control where the latter may be used in regulating the supply of fuel or air or other variables in the boiler operation on which steam pressure and/or temperature depends.

In general it will be seen that I have provided a system useful in all types of power systems, wherein under certain conditions of load as may be represented by throttle position or electrical output, the temperature standard to which the control works is varied to one of predetermined values.

While I have illustrated and described certain preferred embodiments of my invention, I wish it to be understood that I do not expect to be limited thereto except as to the claims in view of prior art.

What I claim as new and desire to secure by Letters Patent of the United States, is:

1. The method of operating a vapor power system which includes, generating vapor at a predetermined first standard of temperature and pressure, supplying the vapor to a consumer, detecting load conditions on the consumer, diverting the vapor from the consumer when the load on the consumer changes in magnitude, and thereafter maintaining a second vapor temperature and pressure standard.

2. The method of operating a vapor power system which includes, generating vapor at a predetermined first standard of pressure, supplying the vapor to a consumer, detecting load conditions on the consumer and diverting the vapor from the consumer when the load on the consumer changes in magnitude, and thereafter maintaining a predetermined second pressure standard.

3. The method of operating a vapor power system which includes, generating vapor at a predetermined standard of temperature and pressure, supplying the vapor to a turbine, driving an electric generator by the turbine, detecting load changes on the generator, diverting the vapor from the turbine upon loss of electric load on the generator and establishing a second predetermined standard of temperature and pressure to be maintained, and thereafter maintaining the second standard.

4. A vapor power system including, a vapor generator producing vapor at a first predetermined standard of temperature and pressure, a turbine supplied the vapor, means for diverting the vapor from the turbine, an electric generator driven by the turbine, and means responsive to load on the generator for actuating the diverting means and establishing a second predetermined standard of temperature and pressure for the vapor.

5. The method of operating a vapor power system which includes, generating vapor at a predetermined standard of temperature, supplying the vapor to a turbine, driving an electric generator by the turbine, detecting the load on the generator, diverting the vapor from the turbine upon loss of electric load on the generator and establishing a second predetermined standard of temperature to be maintained, and thereafter maintaining the second standard.

6. A vapor power system including, a generator producing vapor at a first predetermined standard of temperature, a turbine supplied the vapor, an electric generator driven by the turbine, means responsive to the electric load of the generator for diverting the vapor from the turbine and establishing a second predetermined standard of temperature to be maintained, and means for maintaining the second standard.

7. The method of operating a vapor power system which includes, generating vapor at a predetermined standard of pressure, supplying the vapor to a turbine, driving an electric generator by the turbine, detecting the load on the generator, diverting the vapor from the turbine upon loss of electric load on the generator and establishing a second predetermined standard of pressure to be maintained, and thereafter maintaining the second standard.

8. A vapor power system including, a vapor generator producing vapor at a first predetermined standard of pressure, a turbine supplied the vapor, an electric generator driven by the turbine, means responsive to the loss of electric load by the generator for immediately diverting the vapor from the turbine and establishing a second predetermined standard of pressure to be maintained, and means for maintaining the second standard.

9. The method of controlling the operation of a vapor generator which includes, regulating the supply of fuel and air for combustion to maintain a first predetermined standard of pressure of the vapor outflow, regulating the temperature of the outgoing vapor to maintain a first predetermined standard temperature, detecting load conditions on the generator, under certain load conditions establishing a second predetermined standard pressure and temperature of the vapor and thereafter maintaining the second predetermined standard pressure and temperature of the vapor outflow.

10. A system for controlling the operation of a vapor generator including, means for regulating the supply of fuel and air for combustion to maintain a first predetermined standard pressure of the vapor outflow, means for regulating the temperature of the outflowing vapor for maintaining a first predetermined standard temperature of the vapor outflow, means responsive to certain load conditions for establishing a second predetermined standard pressure and temperature for the vapor outflow, and means for maintaining the second standard.

11. The method of controlling the operation of a vapor generator which includes, regulating the supply of fuel and air for combustion to maintain a first predetermined standard of pressure of the vapor outflow, detecting load conditions on the generator, under certain load conditions establishing a second predetermined standard pressure of the vapor and thereafter maintaining the second predetermined standard pressure of the vapor outflow.

12. The combination with a vapor generator, means for supplying fuel and air for combustion in the furnace of the vapor generator, vapor pressure sensitive means controlling said supply means to maintain a first predetermined pressure standard, means responsive to load changes, and means responsive to the load responsive means for changing the standard to a second predetermined standard under predetermined load changes.

13. In combination, a power plant including a vapor generator supplying vapor to a relatively high temperature and pressure consuming system and alternately supplying vapor to a relatively low temperature and pressure consuming system, valve means for switching the vapor generated from one to the other of said consuming systems, control means for regulating the operation of the vapor generator to maintain one of the two selected standards of vapor temperature and pressure, and means responsive to the load on the consuming systems for positioning said valve to one or the other of two positions and at the same time establishing the correlated temperature and pressure standards to be maintained by said control means.

14. The method of operating a vapor generating system which includes, generating vapor at a predetermined first standard of total temperature, supplying the vapor to a consumer, detecting load conditions on the consumer, diverting the vapor from the consumer upon the occurrence of certain detected load conditions, and thereafter maintaining the predetermined second pressure standard.

15. A vapor generating system including, a vapor generator producing vapor at a first predetermined standard of total temperature, a consumer supplied the vapor, means responsive to predetermined load conditions on the consumer, means responsive to the load responsive means for diverting the vapor from the consumer and thereafter maintaining a second predetermined total temperature standard.

16. A vapor power system including, a vapor generator producing vapor at a predetermined first standard of temperature and pressure, a vapor consumer supplied the vapor, means detecting actual load conditions and responding to the condition detected by selecting a desired load condition for the consumer, means responsive to the detecting means to divert vapor from the consumer, and means responsive to the selection action of the detecting means to maintain a second predetermined vapor temperature and pressure standard after the diversion of the vapor.

17. A vapor power system including a vapor generator producing vapor at a first predetermined standard of pressure, a consumer supplied the vapor, means responsive to predetermined load conditions on the consumer, and means under the control of the load responsive means for diverting the vapor from the consumer and causing the vapor generator to produce vapor at a second predetermined pressure standard following the diversion of the vapor.

PAUL S. DICKEY.

References Cited in the file of this patent

UNITED STATES PATENTS

| Number | Name | Date |
|---|---|---|
| 1,093,161 | Wilkinson | Apr. 14, 1914 |
| 1,095,133 | Wilkinson | Apr. 28, 1914 |
| 1,338,922 | Hopwood | May 4, 1920 |
| 1,743,621 | Quinn | Jan. 14, 1930 |
| 1,894,246 | Stein et al. | Jan. 10, 1933 |
| 1,897,845 | Hilgers | Feb. 14, 1933 |
| 1,925,256 | Kerr | Sept. 5, 1933 |
| 2,133,991 | Kerr | Oct. 25, 1938 |
| 2,155,986 | Wheaton | Apr. 25, 1939 |
| 2,184,224 | Lucke | Dec. 19, 1939 |
| 2,243,944 | Donaldson | June 3, 1941 |
| 2,433,725 | Ziebolz | Dec. 30, 1947 |
| 2,580,345 | Dickey | Dec. 25, 1951 |
| 2,598,235 | Dickey | May 27, 1952 |